United States Patent [19]
Johnson

[11] 3,949,510
[45] Apr. 13, 1976

[54] DEVICE FOR RETRIEVING MINNOWS

[76] Inventor: Kenneth J. Johnson, 8917 Woestboul, East St. Louis, Ill. 62203

[22] Filed: Dec. 30, 1974

[21] Appl. No.: 537,789

[52] U.S. Cl. .................................................. 43/4
[51] Int. Cl.² ...................................... A01K 77/00
[58] Field of Search ............................. 43/4, 11, 12

[56] References Cited
UNITED STATES PATENTS

| | | | |
|---|---|---|---|
| 723,484 | 3/1903 | Paley | 43/12 |
| 2,502,816 | 4/1950 | Bennek | 43/4 |
| 3,098,312 | 7/1963 | Shannon | 43/4 |
| 3,541,722 | 11/1970 | Garrison | 43/4 X |

*Primary Examiner*—Louis G. Mancene
*Assistant Examiner*—Daniel J. Leach
*Attorney, Agent, or Firm*—Gravely, Lieder & Woodruff

[57] ABSTRACT

A device for retrieving minnows individually from a minnow bucket includes a handle and a tubular trap pivotally connected to the handle. The interior of the trap is large enough to accommodate only one minnow, and one of its ends is open so that a minnow will swim into it, while its other end is closed so that the minnow does not swim through the trap. The handle has a gripping portion and two arms which diverge from the gripping portion. The tubular trap is pivotally connected to the arms adjacent the open end of the trap so that when the trap is lifted off the bottom of the bucket, it will assume a vertical deposition with its open end presented upwardly so that the minnow in the trap cannot escape. Retaining means are provided for holding the trap in a compact storage position between the arms of the handle.

10 Claims, 6 Drawing Figures

DEVICE FOR RETRIEVING MINNOWS

BACKGROUND OF THE INVENTION

This invention relates in general to the devices for retrieving fish and more particularly to a device for retrieving individual fish for use as bait.

Minnows constitute one of the most popular forms of bait used by fishermen. Normally, the fisherman keeps a supply of minnows in a minnow bucket and when he wants to bait a hook, he reaches in the minnow bucket and grasps one of the minnows. This can be a time consuming procedure, for minnows are sometimes quite difficult to catch with one's hand, even though they are confined to the minnow bucket. Furthermore, the fisherman must immerse his bare hand in the water of the minnow bucket and this can be quite uncomfortable on a cold day. It further leads to chapped hands.

SUMMARY OF THE INVENTION

The present invention is embodied in fish retriever for trapping and removing fish one at a time from a volume of water in which the fish are swimming. Another object is to provide a retriever of the type stated which is ideally suited for retrieving minnows from a minnow bucket. A further object is to provide a retriever of the type stated which collapses into a highly compact configuration suitable for carrying in a fishing tackle box. An additional object is to provide a retriever of the type stated which is simple in construction and economical to manufacture. These and other objects and advantages will become apparent hereinafter.

The present invention is embodied in a device for retrieving fish from water, and that device includes a handle and a tubular trap connected to the handle. The trap has an open end and a closed end and its interior is large enough to accommodate a fish of the species to be trapped. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
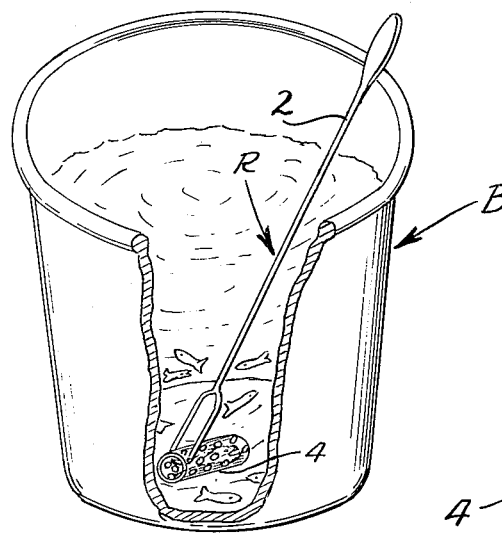
FIG. 1 is a perspective view of a bucket containing a minnow retriever constructed in accordance with and embodying the present invention.

Referring now to the drawings (FIG. 1), R designates a minnow retriever for isolating an individual minnow in a minnow bucket B and for withdrawing the isolated minnow therefrom. The minnow retriever R possesses two basic components, namely, a handle 2 and a tubular trap 4 which is pivotally connected to the handle 2.

Figure 4:
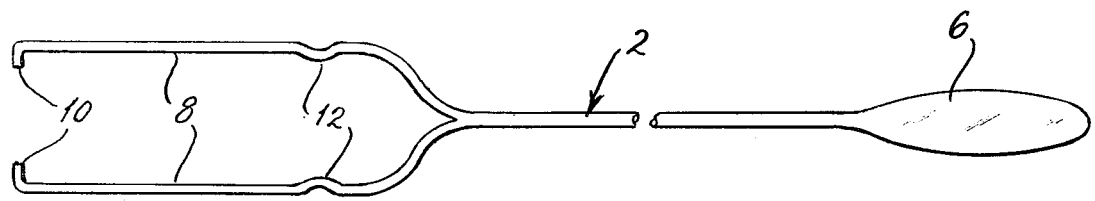
FIG. 4 is a plan view of the handle for the minnow retriever.

The handle 2 is long enough to extend from the bottom of the minnow bucket completely through the water therein, and to project above the water so that it can be grasped without getting one's hands wet. At one end, the handle 2 has a gripping portion 6 (FIG. 4) which is gripped by the user of the retriever R to position the retriever R in or remove it from the minnow bucket B. The opposite end of the handle 4 is bifurcated, having two arms 8 which diverge beyond the gripping portion 6 and are parallel after the divergence. At their free ends, the arms 8 are provided with inwardly directed trunnions 10 which are axially aligned. Just beyond the point where the divergence of the arms 8 ceases and the arms 8 are parallel, the arms 8 are provided with inwardly projecting locking detents or tabs 12. The handle 2 is preferably molded from plastic, and in any event the material from which it is formed should have a limited amount of resiliency so that the arms 8 may be spread apart slightly to accommodate the tubular trap 4.

Figure 6:
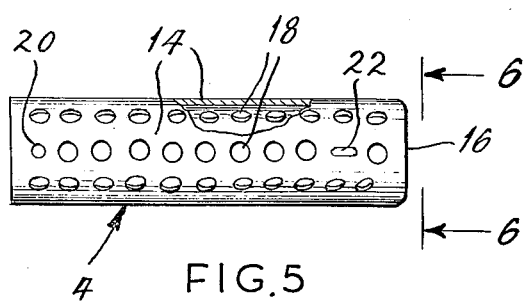
FIG. 6 is an end view of the tubular trap.
Figure 5:
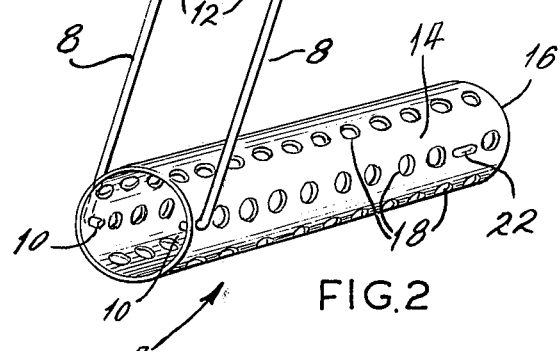
FIG. 5 is a side view of the tubular trap for the minnow retriever.
Figure 3:
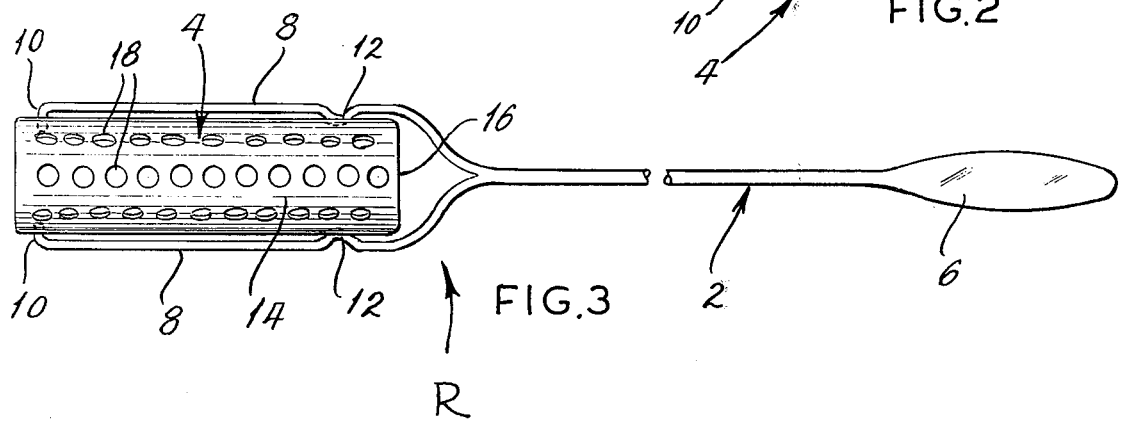
FIG. 3 is a plan view of the minnow retriever in its storage position.

The tubular trap 4 is cylindrical in configuration and has a cylindrical sidewall 14 (FIG. 5) the inside diameter of which is large enough to accommodate only a single minnow. An inside diameter of ¾ inch has been found to be suitable for this purpose. The outside diameter is smaller than the spacing between the parallel portions of the arms 8, but is greater than the spacing between the opposed trunnions 10 and tabs 12 on those arms 8 (FIG. 3). One end of the tubular trap 4 is open, while the other end is closed by an end wall 16 (FIG. 6) which is attached to the sidewall 14. Both the sidewall 14 and the end wall 16 are provided with apertures 18 so that water will circulate freely through the trap 4 when it is in the bucket B and will readily drain from the trap 4 once it is removed from the bucket B.

Near the open end of the trap 4, the sidewall 14 has outwardly opening sockets 20 which are cylindrical and are large enough to freely accommodate the trunnions 10 on the arms 8 so that the trap 4 will easily swing about the trunnions 10. At the closed end of the trap 4, the sidewall 14 has outwardly opening indents 22 which align with the tabs 12 on the arms 8 and will receive those tabs 12 if the trap 4 is moved between the arms 8 and the arms 8 are spread slightly apart.

The trap 4 may be molded as an integral unit from plastic.

OPERATION

Figure 2:
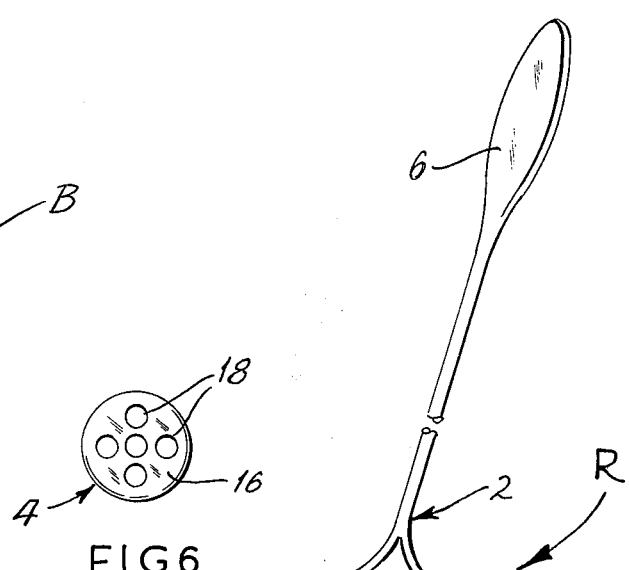
FIG. 2 is a perspective view of the minnow retriever in its operative position in which the tubular trap is positioned to trap a minnow.

The minnow retriever R is assembled merely by spreading the arms 8 of the handle 2 slightly and then inserting the tubular trap 4 between the spread apart arms 8 with the sockets 20 in the sidewall 14 of the trap 4 being aligned with the trunnions 10. Then the spreading force on the arms 8 is released and the arms 8 move together to enable the trunnions 10 to enter the sockets 20. The trunnions 10 retain the tubular trap 4 on the handle 2, yet permit the trap 4 to swing freely with respect to the handle 2 (FIG. 2).

When the minnow retriever R is not in use, the tubular trap 4 is moved to a storage position between the two arms 8 (FIG. 3). In that position, the tabs 12 on the two arms 8 project into the indents 22 on the sidewall 14 of the trap 4 and prevent the trap 4 from swinging relative to the handle 2. Thus, the tabs 12 together with the indents 22 constitute retaining means for holding the trap 4 in its storage position. The indents 22 are relatively shallow so that the trap 4 can be brought into its storage position merely by forcing it through the space between the two arms 8 until the tabs 12 snap into the indents 22. As the trap 4 moves toward its storage position, the cylindrical outer surface of the sidewall 14 bears against the tabs 12 and cams then apart until they snap into the indents 22. The trap 4 is likewise dislodged from its storage position merely by forcing its closed end out of the centered position between the arms 8.

In use, the retriever R with its trap 4 out of the storage position, is grasped at the gripping portion 6 or the handle 2 and is inserted into the minnow bucket B with tubular trap 4 entering the water first. The tubular trap 4 is allowed to rest on the bottom surface of the bucket B in a horizontal disposition with its open end located away from the bucket sidewalls (FIG. 1). The handle 2 is then allowed to rest against the sidewalls of the bucket B. In this regard, the handle 2 is long enough to extend from the bottom of the bucket B through the water, and completely out of the top of the bucket B so that the user can grasp the handle 2 to withdraw the retriever R from the bucket B without getting his hands wet.

Minnows have a propensity to enter holes and when they enter a bind hole, they often do not escape. Thus, after the retriever R is in the water of the minnow bucket B for a short while, a minnow will swim into the open end of the tubular trap 4. While the minnow can swim backwardly and back out of the trap 4, another minnow will always be waiting to take its place. Thus, the tubular trap 4, is always occupied by a minnow.

When a minnow is needed to bait a fish hook, the handle 2 is grasped and the entire retriever R is withdrawn from the bucket B. As the trap 4 is raised, it swings to a vertical position in which the minnow is presented head down and cannot escape. The water, however, will drain back into the bucket B through the apertures 18.

The tubular trap 4 is then inverted so that the minnow in it falls out and can be placed on a fish hook.

Thus, it is apparent that the minnow retriever R supplies a minnow as bait whenever such a minnow is needed. Furthermore, the minnow is retrieved without immersing one's hands in the water of the minnow bucket.

This invention is intended to cover all changes and modifications of the example of the invention herein chosen for purposes of the disclosure which do not constitute departures from the spirit and scope of the invention.

What is claimed is:

1. In a minnow bucket containing water and minnows in the water, a device for retrieving the minnow individually from the water in the bucket, said device comprising: a handle long enough to extend from the bottom of the bucket completely through the water and to project above the upper surface of the water so that it can be grasped without getting one's hands wet; and a tubular trap pivotally connected to one end of the handle so that it will rest horizontally on the bottom of the bucket, the trap having a hollow interior sized to accommodate a single minnow, the trap further having its one end open so that a minnow can swim into the hollow interior and its other end closed so that the minnow cannot escape by merely swimming through the trap.

2. The structure according to claim 1 wherein the handle is pivotally connected to the trap closer to the open end of the trap than the closed end so that the trap will assume a vertical disposition with the open end presented upwardly when the trap is raised off of the bottom of the bucket with the handle.

3. A device for retrieving fish from water, said device comprising: a tubular trap having its interior large enough to accommodate a fish and further having its one end open so that the fish can swim into the interior and its other end closed to prevent the fish from swimming completely through the trap; a rigid handle pivotally connected to the tubular trap and having a gripping portion which is grasped so that the entire retrieving device may be withdrawn from water, the handle further having at least one arm into which the gripping portion merges with the tubular member being pivotally connected to the arm; and retaining means on the arm and the tubular trap for holding the trap in a predetermined storage position alongside the arm.

4. A retrieving device according to claim 3 wherein the retaining means comprises: a tab on the arm and an indentation on the trap, the indentation being adapted to align with the tab and the tab being long enough to snap into the indentation when the trap is brought alongside the arm, whereby the trap will be retained in the storage position.

5. A device for retrieving fish from water, said device comprising: a tubular trap having its interior large enough to accommodate a fish and further having its one end open so that the fish can swim into the interior and its other end closed to prevent the fish from swimming completely through the trap; and a rigid handle connected to the tubular trap and having a gripping portion which is grasped so that the entire retrieving device may be withdrawn from water, the handle further having a pair of arms which diverge beyond the gripping portion and are pivotally connected at their ends to the tubular trap adjacent the open end of the tubular trap so that when the trap is raised with the handle it will assume a vertical disposition in which a fish in the trap will not escape, the arms being longer than the trap and the spacing between the arms for the most part being greater than the width of the trap so that the trap can assume a compact storage position intermediate the arms.

6. A retrieving device according to claim 5 wherein the tubular trap has laterally opening sockets adjacent to its open end and the arms are provided with trunnions which project into the sockets so as to permit the trap to swing relative to the arms.

7. A retrieving device according to claim 5 wherein the trap has laterally opening indents remote from the pivotal connection with the arms and the arms have inwardly projecting detents which project into the indents when trap is disposed between the arms so as to retain the trap in a generally fixed position between the arms.

8. A device for retrieving a minnow from water, said device comprising: a rigid tubular element having a hollow interior which is large enough to receive a minnow, but narrow enough to prevent the minnow from turning around therein, the tubular element having one of its ends always open and unobstructed so that a minnow can swim into the open end as well as back out of it and the other end permanently closed so that the minnow cannot under any circumstance leave the hollow interior through the permanently closed end, whereby when the tubular element is allowed to rest in a horizontal disposition within the water, the minnows, owing to their natural tendency to swim into holes, will enter the hollow interior of the tubular element through the open end thereof; and a handle pivotally connected to the tubular element to enable the tubular element to rest in a generally horizontal disposition on a supporting surface while the handle rests against an upright surface, the pivotal connection being on that side of the center of gravity for the tubular element to which the open end is disposed and further being such that when the tubular element is lifted upwardly with the handle, the tubular element will swing freely from the generally horizontal disposition in which it was supported to a substantially vertical disposition in which it is suspended from the handle with the closed end of the tubular element presented downwardly, whereby the minnow will be trapped in the tubular element, the handle being rigid so that it will remain upright in the water when against the upright surface and can be projected out of the water to enable one to grasp it without getting one's hands wet.

9. A device according to claim 8 wherein the tubular element is provided with apertures which are substantially smaller than the minnow so that water will circulate freely through the interior of the tubular element.

10. A device according to claim 8 wherein the interior of the tubular element is cylindrical in configuration and has a diameter of approximately ¾ inches.

* * * * *